(12) United States Patent
Määttanen

(10) Patent No.: US 11,166,185 B2
(45) Date of Patent: Nov. 2, 2021

(54) MEASUREMENT REPORTING PROHIBIT TIMER FOR MEASUREMENT OF SIGNALS ORIGINATING FROM TWO DIFFERENT CELLS OR BEAMS

(71) Applicant: Telefonaktiebolaget LM Ericsson (publ), Stockholm (SE)

(72) Inventor: Helka-Liina Määttanen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 16/608,927

(22) PCT Filed: May 2, 2018

(86) PCT No.: PCT/IB2018/053057
§ 371 (c)(1),
(2) Date: Oct. 28, 2019

(87) PCT Pub. No.: WO2018/203261
PCT Pub. Date: Nov. 8, 2018

(65) Prior Publication Data
US 2020/0187035 A1    Jun. 11, 2020

Related U.S. Application Data

(60) Provisional application No. 62/501,854, filed on May 5, 2017.

(51) Int. Cl.
*H04W 24/02* (2009.01)
*H04W 24/10* (2009.01)
*H04W 88/02* (2009.01)

(52) U.S. Cl.
CPC ............ *H04W 24/10* (2013.01); *H04W 88/02* (2013.01)

(58) Field of Classification Search
None
See application file for complete search history.

(56) References Cited

U.S. PATENT DOCUMENTS

| 2010/0190488 | A1* | 7/2010 | Jung ................. H04W 24/10 455/424 |
| 2010/0208707 | A1* | 8/2010 | Hamabe ............ H04W 36/0094 370/332 |
| 2018/0206133 | A1* | 7/2018 | Venkatraman ......... H04L 47/29 |

FOREIGN PATENT DOCUMENTS

| CN | 102104897 A | 6/2011 |
| EP | 2 924 904 A1 | 9/2015 |

(Continued)

OTHER PUBLICATIONS

PCT Notification of Transmittal of the International Search Report and the Written Opinion of the International Searching Authority, or the Declaration for International application No. PCT/IB2018/053057—dated Sep. 28, 2018.

(Continued)

*Primary Examiner* — Ayanah S George
(74) *Attorney, Agent, or Firm* — Baker Botts, LLP

(57) ABSTRACT

According to some embodiments, a method in a wireless device of limiting transmission of measurement reports comprises receiving a first measurement triggering event for an event type. The first measurement triggering event is associated with a first wireless signal. The method further comprises: transmitting a measurement report for the first measurement triggering event; initiating a measurement reporting limiting procedure for the event type; and receiving a second measurement triggering event for the event type. The second measurement triggering event is associated with a second wireless signal different than the first wireless signal. The method further comprises determining the measurement reporting limiting procedure is active for the event (Continued)

400

412 - transmit a measurement reporting limiting procedure configuration to a wireless device 414 - receive a measurement report from the wireless device, the measurement report including an indication of how many times a measurement report for a triggered event type was not transmitted by the wireless device 416 - determine whether the wireless device (e.g., unmanned aerial vehicle) is airborne based on the received indication of how many times the measurement report for the triggered event type was not transmitted type and determining not to transmit a measurement report for the second measurement triggering event. In some embodiments, the wireless device comprises an unmanned aerial vehicle (UAV).

26 Claims, 6 Drawing Sheets

(56) References Cited

FOREIGN PATENT DOCUMENTS

| | | |
|---|---|---|
| JP | H10-248090 A | 9/1998 |
| JP | 2002-27518 A | 1/2002 |

OTHER PUBLICATIONS

3GPP TSG-RAN WG2 #101; Athens, Greece; Source: Ericsson; Title: Measurement reporting enhancement (Tdoc-1802789)—Feb. 26-Mar. 2, 2018.
3GPP TSG-RAN WG2 #101bis; Sanya, China; Source: Ericsson; Title: Measurement framework enhancement for mobility for aerial UEs while airborne (Tdoc R2-1805610)—Apr. 16-20, 2018.
JP Notice of Reasons for Rejection issued for Patent Application No. 2019-560175—dated Feb. 16, 2021.

\* cited by examiner

MEASUREMENT REPORTING PROHIBIT TIMER FOR MEASUREMENT OF SIGNALS ORIGINATING FROM TWO DIFFERENT CELLS OR BEAMS

PRIORITY

This nonprovisional application is a U.S. National Stage Filing under 35 § 371 of International Patent Application Serial No. PCT/IB2018/053057 filed May 2, 2018 and entitled "Measurement Reporting Prohibit Timer for Measurement of Signals Originating from Two Different Cells or Beams" which claims priority to U.S. Provisional Patent Application No. 62/501,854 filed May 5, 2017 both of which are hereby incorporated by reference in their entirety.

TECHNICAL FIELD

Particular embodiments are directed to wireless communications and, more particularly, to prohibiting measurement reporting based on recent measurement reports.

BACKGROUND

The present disclosure is described within the context of Third Generation Partnership Project (3GPP) long term evolution (LTE) (i.e., enhanced universal terrestrial radio access network (E-UTRAN)). The problems and solutions described herein, however, are equally applicable to wireless access networks and user-equipment (UEs) implementing other access technologies and standards. LTE is used as an example technology where the solution is suitable. Using LTE in the description, therefore, is particularly useful for understanding the problems and solutions.

3GPP specifications include serving aerial vehicles using LTE network deployments with base station antennas targeting terrestrial coverage. Particular specifications are related to interference caused by drones (i.e., unmanned aerial vehicles (UAV)) using the LTE network and performing handover between cells in the network. An objective of particular LTE specifications is to provide connectivity and positioning services to drones.

An air-borne UE may experience radio propagation characteristics that are different than those experienced by a UE on or close to the ground. When an aerial vehicle is flying at a low altitude relative to a base station antenna height, the aerial vehicle behaves like a conventional UE. When the aerial vehicle is flying well above the base station antenna height, however, the uplink signal from the aerial vehicle becomes more visible to multiple cells because of line-of-sight propagation conditions.

The uplink signal from the aerial vehicle may increase interference in neighbor cells. The increased interference negatively impacts a conventional UE on or near the ground (e.g., smartphone, Internet-of-Things (IoT) device, etc.). Thus, the network may need to limit the admission of aerial vehicles in the network to restrict the perceived throughput performance of the conventional UEs.

Furthermore, because the base station antennas may be down tilted, while on the ground or below the base station height, the UE is likely served by the main lobe of the antennas. However, when the drone is flying above antenna boresight, the drone is likely served by the side lobes of the antennas. An example is illustrated in FIG. 1.

FIG. 1 is a schematic diagram illustrating an unmanned aerial vehicle flying above base station antenna height. UAV 10 is served by base station 20a. At a flying height above 200 feet, for example, UAV 10 may receive interference from base stations 20b or 20c, or may interfere with UEs served by base stations 20b or 20c. More information may be found in RP-170779, "New SID on Enhanced Support for Aerial Vehicles," the entirety of which is incorporated by reference.

One way for the network to determine the strength of a link, and therefore how strong the interference is, is the reference signal received power/quality (RSRP/Q) or reference signal signal-to-interference-plus-noise ratio (RS-SINR) measurements. RSRP measures the downlink signal. A frequency division duplex (FDD) system may not assume full reciprocity. The link qualities in uplink and downlink, however, are not totally independent. The RSRP values may also provide a rough idea on the uplink link quality. Further, the RSRP measurements are also used for drone mobility.

One aspect of measurement configuration is the measurement reporting configuration, which can be found in 3GPP TS 36.331 Section 5.5.1. The configuration may include a list of reporting configurations where each reporting configuration consists of the following.

The reporting criterion is the criterion that triggers the UE to send a measurement report. This can either be periodical or a single event description.

The reporting format includes the quantities that the UE includes in the measurement report and associated information (e.g., number of cells to report).

The single event triggered can be one shot based on the event trigger fulfilled or "event triggered periodical" such that after the event is triggered the measurement is sent periodically. Both normal periodic and event triggered periodic measurements are controlled with report interval and report amount, which are described in TS 36.331 as follows:

reportAmount: number of measurement reports applicable for triggerType event as well as for triggerType periodical. In case purpose is set to reportCGI or reportStrongestCellsForSON only value 1 applies.

ReportInterval: indicates the interval between periodical reports. The ReportInterval is applicable if the UE performs periodical reporting (i.e., when reportAmount exceeds 1), for triggerType event as well as for triggerType periodical. Value ms120 corresponds with 120 ms, ms240 corresponds with 240 ms and so on, while value min1 corresponds with 1 min, min6 corresponds with 6 min and so on.

Measurement reporting is described in 3GPP TS 36.331 Section 5.5.5. For event triggered and event triggered periodic, the procedure is described in section 5.5.4:

If the triggerType is set to event and if the entry condition applicable for the event (i.e., the event corresponding with the eventId of the corresponding reportConfig within VarMeasConfig) is fulfilled for one or more applicable cells not included in the cellsTriggeredList for all measurements after layer 3 filtering taken during timeToTrigger defined for this event within the VarMeasConfig (a subsequent cell triggers the event), then set the numberOfReportsSent defined within the VarMeasReportList for this measId to 0, and include the concerned cell(s) in the cellsTriggeredList defined within the VarMeasReportList for this measId. If the UE supports T312 and if useT312 is included for this event and if T310 is running, then if T312 is not running, start timer T312 with the value configured in the corresponding measObject. Then initiate the measurement reporting procedure as specified in Section 5.5.5.

The following events are defined in LTE for E-UTRA and inter-RAT. The information element (IE) ReportConfigEUTRA specifies criteria for triggering of an E-UTRA measurement reporting event. The E-U IRA measurement reporting events concerning cell specific reference signal (CRS) are labelled AN, with N equal to 1, 2 and so on.

Event A1: Serving becomes better than absolute threshold;

Event A2: Serving becomes worse than absolute threshold;

Event A3: Neighbor becomes amount of offset better than PCell/PSCell;

Event A4: Neighbor becomes better than absolute threshold;

Event A5: PCell/PSCell becomes worse than absolute threshold1, and neighbor becomes better than another absolute threshold2.

Event A6: Neighbor becomes amount of offset better than SCell.

The E-UTRA measurement reporting events concerning CSI-RS are labelled CN, with N equal to 1 and 2.

Event C1: CSI-RS resource becomes better than absolute threshold;

Event C2: CSI-RS resource becomes amount of offset better than reference CSI-RS resource;

Event V1: CBR becomes larger than absolute threshold;

Event V2: CBR becomes smaller than absolute threshold.

The IE ReportConfigInterRAT specifies criteria for triggering of an inter-RAT measurement reporting event. The inter-RAT measurement reporting events for UTRAN, GERAN and CDMA2000 are labelled BN, with N equal to 1, 2 and so on. The inter-RAT measurement reporting events for WLAN are labelled WN, with N equal to 1, 2 and so on.

Event B1: Neighbor becomes better than absolute threshold;

Event B2: PCell becomes worse than absolute threshold1, and neighbor becomes better than another absolute threshold2.

Event W1: WLAN becomes better than a threshold;

Event W2: All WLAN inside WLAN mobility set become worse than a threshold1 and a WLAN outside WLAN mobility set becomes better than a threshold2;

Event W3: All WLAN inside WLAN mobility set become worse than a threshold.

The b1 and b2 event thresholds for CDMA2000 are the CDMA2000 pilot detection thresholds and are expressed as an unsigned binary number equal to [−2×10 log 10 Ec/Io] in units of 0.5 dB.

When a UE is configured with event-triggered measurements, for example with event A1, and a cell becomes 3 dB better than the serving cell, the UE triggers the measurement report. The numberOfReportsSent is a counter towards report amount and is set to 0 every time the event is triggered by new cells/reference signal configuration. The report amount thus controls only the amount of periodic reports for the event periodic reporting. The cellsTriggeredList controls that the same cells do not trigger the procedure multiple times.

For drones, however, multiple cells/reference signal configurations may fulfill the entry condition consecutively. The event may be triggered multiple times within a short time initiating multiple measurement results.

The same issue may also arise for NR where one cell sends multiple beams and a UE is configured to measure the beam quality based on NR reference signals like SS block or channel state information-reference signal (CSI-RS).

SUMMARY

The embodiments described herein include a timer that prevents triggering the same event consecutively. The timer may be referred to as a "prohibit timer." According to some embodiments, a counter enables sending the measurement report triggered by the same event every second, third, fourth, etc. time that the same event is triggered.

According to some embodiments, a method in a wireless device of limiting transmission of measurement reports comprises receiving a first measurement triggering event for an event type. The first measurement triggering event is associated with a first wireless signal. The method further comprises: transmitting a measurement report for the first measurement triggering event; initiating a measurement reporting limiting procedure for the event type; and receiving a second measurement triggering event for the event type. The second measurement triggering event is associated with a second wireless signal different than the first wireless signal. The method further comprises determining the measurement reporting limiting procedure is active for the event type and determining not to transmit a measurement report for the second measurement triggering event. The wireless device may comprise an unmanned aerial vehicle (UAV).

In particular embodiments, initiating the measurement reporting limiting procedure for the event type comprises starting a timer. Determining whether the measurement reporting limiting procedure is active for the event type may comprise determining whether the timer has expired.

In particular embodiments, initiating the measurement reporting limiting procedure for the event type comprises resetting a counter. Determining whether the measurement reporting limiting procedure is active for the event type may comprise determining whether the counter is below a threshold value. Upon determining the measurement reporting limiting procedure is active for the event type, the method may further comprise incrementing the counter.

In particular embodiments, the method further comprises, upon determining the measurement reporting limiting procedure is not active for the event type, transmitting a measurement report for the second measurement triggering event. The method may further comprise receiving a measurement reporting limiting procedure configuration. The measurement reporting limiting procedure configuration may comprise at least one of a timer value or a counter threshold value.

In particular embodiments, the first wireless signal originates from a first cell and the second wireless signal originates from a second cell different than the first cell. In some embodiments, the first wireless signal may comprise a first beamformed wireless signal and the second wireless signal may comprise a second beamformed wireless signal.

According to some embodiments, a wireless device comprises processing circuitry operable to receive a first measurement triggering event for an event type. The first measurement triggering event is associated with a first wireless signal. The processing circuitry is further operable to: transmit a measurement report for the first measurement triggering event; initiate a measurement reporting limiting procedure for the event type; and receive a second measurement triggering event for the event type. The second measurement triggering event is associated with a second wireless signal different than the first wireless signal. The processing circuitry is further operable to determine whether the measurement reporting limiting procedure is active for the event type and, upon determining the measurement reporting limiting procedure is active for the event type, determine not to transmit a measurement report for the second measurement triggering event. The wireless device may comprise an unmanned aerial vehicle.

In particular embodiments, the processing circuitry is operable to initiate the measurement reporting limiting procedure for the event type by starting a timer. The processing circuitry may be operable to determine whether the measurement reporting limiting procedure is active for the event type by determining whether the timer has expired.

In particular embodiments, the processing circuitry is operable to initiate the measurement reporting limiting procedure for the event type by resetting a counter. The processing circuitry may be operable to determine whether the measurement reporting limiting procedure is active for the event type by determining whether the counter is below a threshold value and, upon determining the measurement reporting limiting procedure is active for the event type, increment the counter.

In particular embodiments, the processing circuitry is further operable to, upon determining the measurement reporting limiting procedure is not active for the event type, transmit a measurement report for the second measurement triggering event. The processing circuitry may be further operable to receive a measurement reporting limiting procedure configuration. The measurement reporting limiting procedure configuration may comprise at least one of a timer value or a counter threshold value.

In particular embodiments, the first wireless signal originates from a first cell and the second wireless signal originates from a second cell different than the first cell. In some embodiments, the first wireless signal comprises a first beamformed wireless signal and the second wireless signal comprises a second beamformed wireless signal.

According to some embodiments, a method in a network node of limiting transmission of measurement reports comprises transmitting a measurement reporting limiting procedure configuration to a wireless device and receiving a measurement report from the wireless device. The measurement report includes an indication of how many times a measurement report for a triggered event type was not transmitted by the wireless device. The measurement reporting limiting procedure configuration may comprise at least one of a timer value or a counter threshold value.

In particular embodiments, the wireless device comprises an unmanned aerial vehicle. The method may further comprise determining whether the unmanned aerial vehicle is airborne based on the received indication of how many times the measurement report for the triggered event type was not transmitted.

According to some embodiments, a network node comprises processing circuitry operable to transmit a measurement reporting limiting procedure configuration to a wireless device and receive a measurement report from the wireless device. The measurement report includes an indication of how many times a measurement report for a triggered event type was not transmitted by the wireless device. The measurement reporting limiting procedure configuration may comprise at least one of a timer value or a counter threshold value.

In particular embodiments, the wireless device comprises an unmanned aerial vehicle. The processing circuitry may be further operable to determine whether the unmanned aerial vehicle is airborne based on the received indication of how many times the measurement report for the triggered event type was not transmitted.

According to some embodiments, a wireless device comprises a receiving module, a determining module, and a transmitting module. The receiving module is operable to receive a first measurement triggering event for an event type. The first measurement triggering event is associated with a first wireless signal. The transmitting module is operable to transmit a measurement report for the first measurement triggering event. The determining module is operable to initiate a measurement reporting limiting procedure for the event type. The receiving module is further operable to receive a second measurement triggering event for the event type. The second measurement triggering event is associated with a second wireless signal different than the first wireless signal. The determining module is further operable to determine whether the measurement reporting limiting procedure is active for the event type and, upon determining the measurement reporting limiting procedure is active for the event type, determine not to transmit a measurement report for the second measurement triggering event.

According to some embodiments, a network node comprises a receiving module and a transmitting module. The transmitting module is operable to transmit a measurement reporting limiting procedure configuration to a wireless device. The receiving module is operable to receive a measurement report from the wireless device. The measurement report includes an indication of how many times a measurement report for a triggered event type was not transmitted by the wireless device.

Also disclosed is a computer program product. The computer program product comprises instructions stored on non-transient computer-readable media which, when executed by a processor, perform the steps of: receiving a first measurement triggering event for an event type; transmitting a measurement report for the first measurement triggering event; initiating a measurement reporting limiting procedure for the event type; receiving a second measurement triggering event for the event type; determining the measurement reporting limiting procedure is active for the event type; and determining not to transmit a measurement report for the second measurement triggering event.

Another computer program product comprises instructions stored on non-transient computer-readable media which, when executed by a processor, perform the steps of: transmitting a measurement reporting limiting procedure configuration to a wireless device; and receiving a measurement report from the wireless device.

Certain embodiments of the present disclosure may provide one or more technical advantages. For example, according to certain embodiments, if the measurement object is a frequency, the prohibit timer or counter might prevent triggering the same or almost the same measurement report in certain situation when it is likely that the same event might be triggered consecutively. At the same time this enables timely reporting when the event is triggered the first time. Other advantages may be readily available to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
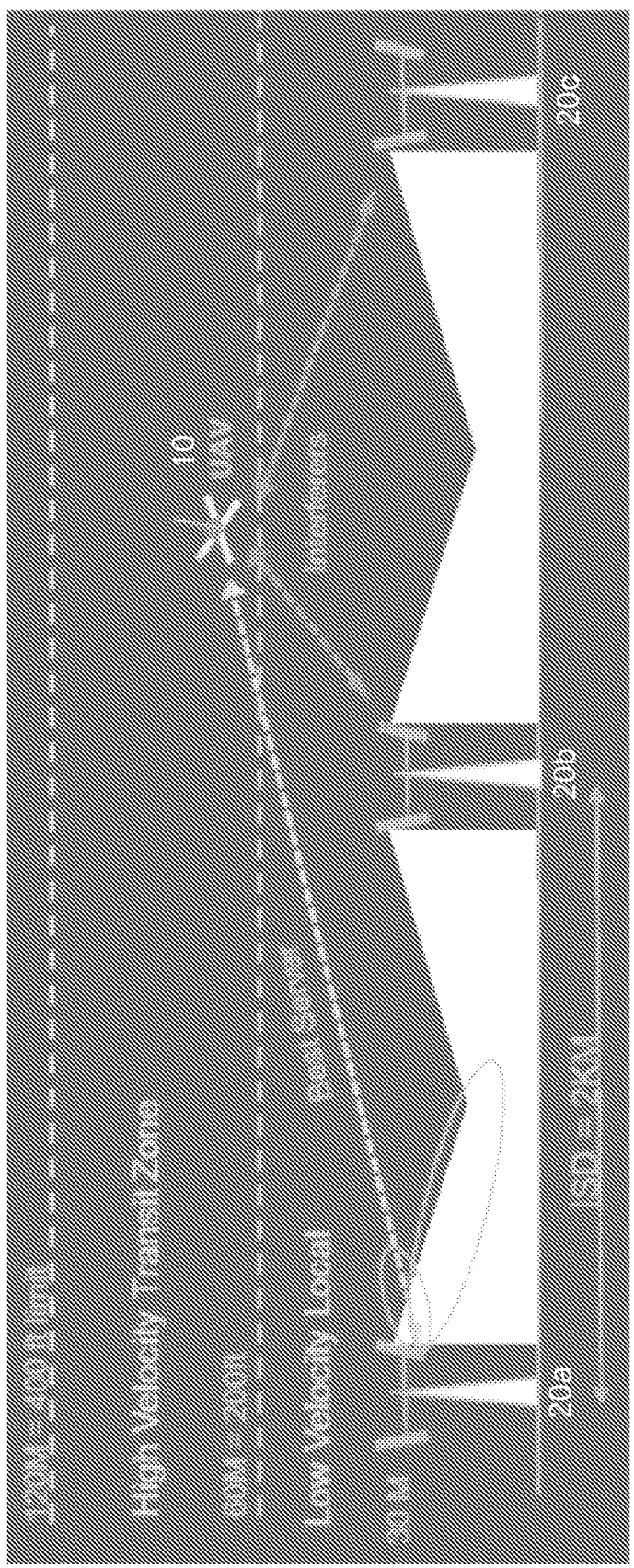
FIG. 1 is a schematic diagram illustrating an unmanned aerial vehicle flying above base station antenna height.

The present disclosure is described within the context of Third Generation Partnership Project (3GPP) long term evolution (LTE), although problems and solutions described herein are equally applicable to wireless access networks and user-equipment (UE) implementing other access technologies and standards. 3GPP specifications include serving aerial vehicles using LTE network deployments with base station antennas targeting terrestrial coverage. Particular specifications are related to interference caused by unmanned aerial vehicles (UAVs) using the LTE network and performing handover between cells in the network. An objective of particular LTE specifications is to provide connectivity and positioning services to drones.

An air-borne UE may experience radio propagation characteristics that are different than those experienced by a UE on or close to the ground. When an aerial vehicle is flying at a low altitude relative to a base station antenna height, the aerial vehicle behaves like a conventional UE. When the aerial vehicle is flying well above the base station antenna height, however, the uplink signal from the aerial vehicle becomes more visible to multiple cells because of line-of-sight propagation conditions.

The uplink signal from the aerial vehicle may increase interference in neighbor cells. The increased interference negatively impacts a conventional UE on or near the ground (e.g., smartphone, Internet-of-Things (IoT) device, etc.). Furthermore, because the base station antennas may be down tilted, while on the ground or below the base station height, the UE is likely served by the main lobe of the antennas. However, when airborne the drone is likely served by the side lobes of the antennas.

One way for the network to determine the strength of a link, and therefore how strong the interference is, is the reference signal received power/quality (RSRP/Q) or reference signal signal-to-interference-plus-noise ratio (RS-SINR) measurements. One aspect of measurement configuration is the measurement reporting configuration. The configuration may include a list of reporting configurations where each reporting configuration consists of the reporting criterion (i.e., the criterion that triggers the UE to send a measurement report) and the reporting format (i.e., the quantities that the UE includes in the measurement report).

For UAVs multiple cells/reference signal configurations may trigger the measurement condition consecutively. The event may be triggered multiple times within a short time initiating multiple measurement results.

The same issue may also arise for 5G new radio (NR) where one cell sends multiple beams and a UE is configured to measure the beam quality based on NR reference signals like system synchronization (SS) block or channel state information-reference signal (CSI-RS).

Particular embodiments include a timer that prevents triggering the same event consecutively (also referred to as a prohibit timer). Particular embodiments include a counter that facilitates sending the measurement report triggered by the same event every second, third, fourth, etc. time when the same event is triggered. The prohibit timer or the counter may be associated with an event corresponding with the eventId of the corresponding reportConfig within VarMeasConfig. According to certain embodiments, the timer and/or counter may be defined in a UE. According to alternative embodiments, they may be defined in a network node.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-6B of the drawings, like numerals being used for like and corresponding parts of the various drawings. LTE and NR are used throughout this disclosure as an example cellular system, but the ideas presented herein may apply to other wireless communication systems as well.

Figure 2:
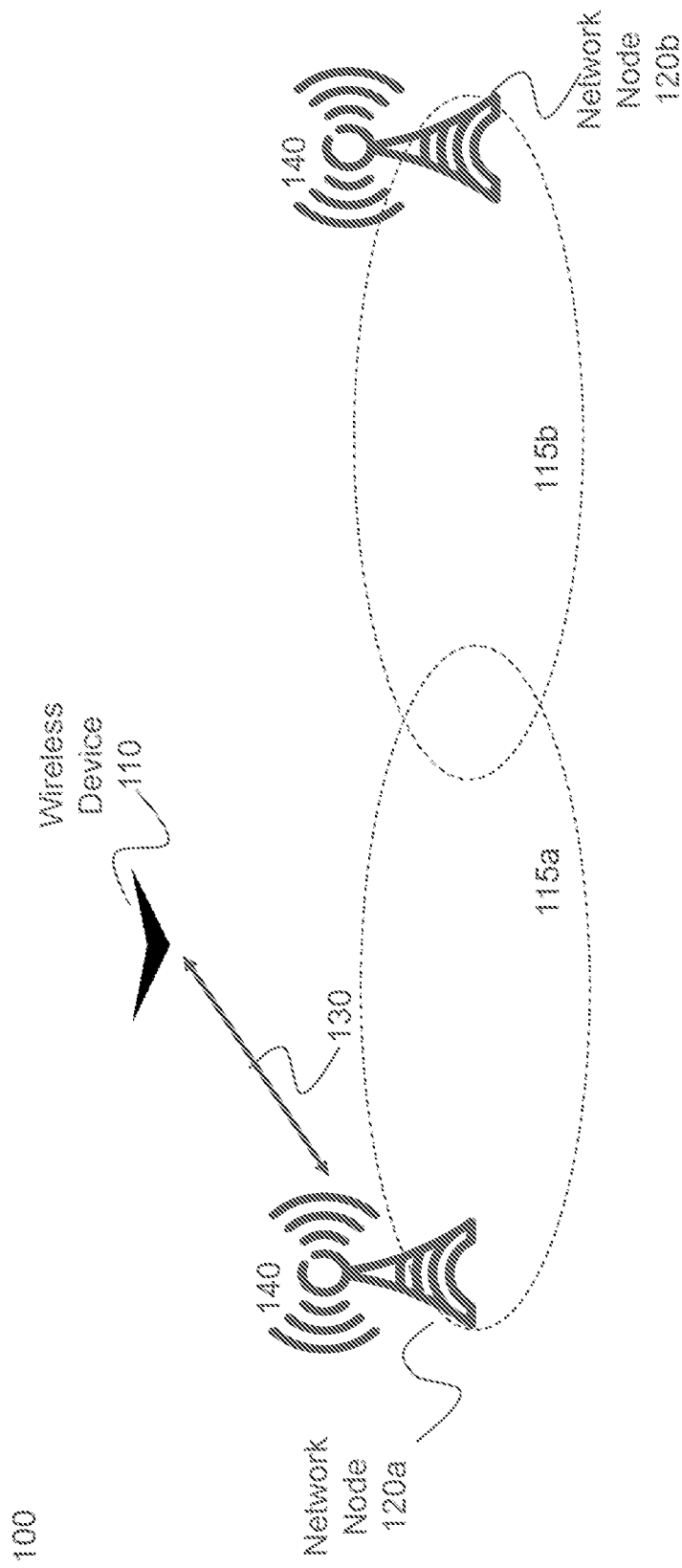
FIG. 2 is a block diagram illustrating an example wireless network, according to some embodiments.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations, eNodeBs, gNBs, etc.). In particular embodiments, wireless device 110 may include an unmanned aerial vehicle (UAV). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

When wireless device 110 comprises a portion of a UAV, wireless device 110 may transmit and receive wireless signals 130 from a position above network node 120. The uplink signal from the aerial vehicle may be visible to cells 115a and 115b. The UAV is likely served by the side lobes of network nodes 120a or 120b.

According to some embodiments, wireless device 110 may limit transmission of measurement reports when wireless device 110 receives multiple event triggers of the same type from both cell 115a and cell 115b. For example, wireless device 110 may receive a first measurement triggering event for an event type. The first measurement triggering event is associated with a first wireless signal (e.g., a downlink reference signal from cell 115a).

Wireless device 110 may transmit a measurement report for the first measurement triggering event. Wireless device 110 may also initiate a measurement reporting limiting procedure for the event type so that additional triggers for the same event type received in the near future will not be reported.

For example, wireless device 110 may receive a second measurement triggering event for the event type. The second measurement triggering event is associated with a second wireless signal different than the first wireless signal (e.g., a downlink reference signal from cell 115b). Wireless device 110 determines the measurement reporting limiting procedure is active for the event type and thus determines not to transmit a measurement report for the second measurement triggering event.

In particular embodiments, initiating the measurement reporting limiting procedure for the event type comprises starting a timer or incrementing a counter. Determining whether the measurement reporting limiting procedure is active for the event type may comprise determining whether the timer has expired, or a counter has passed a threshold.

In the example above, the first and second wireless signals originate from different cells. In some embodiments, the first and second wireless signals may comprise different beams from the same cell.

According to some embodiments, network node 120 limits transmission of measurement reports by transmitting a measurement reporting limiting procedure configuration to wireless device 110 and receiving a measurement report from wireless device 110. The measurement report may include an indication of how many times a measurement report for a triggered event type was not transmitted by the wireless device. The measurement reporting limiting procedure configuration may comprise at least one of a timer value or a counter threshold value.

In particular embodiments, where wireless device 110 comprises an unmanned aerial vehicle (or any other wireless device positioned above the network node), wireless device 110 determines whether the unmanned aerial vehicle is airborne based on the received indication of how many times the measurement report for the triggered event type was not transmitted. For example, a high count may indicate that wireless device 110 is airborne.

In some embodiments, wireless device 110 may include or be included in a UAV. The UAV may comprise an airframe body coupled to flight components, such as one or more propellers coupled to one or motors for providing lift and steering control. The motors may be coupled to one or more power supplies (e.g., battery, liquid fuel, etc.).

The airframe body may also be coupled to one or more mechanical and/or electronic controllers. The controllers may control flight characteristics, such as the speed and angle of the motors and propellers. The controllers may also provide navigational control. While general components of a UAV are described herein, particular embodiments may include more, less, or different components, and may comprise any suitable aerial vehicle.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a land-line telephone). A wireless device may include any suitable combination of hardware and/or software. For example, in particular embodiments, a wireless device, such as wireless device 110, may include the components described with respect to FIG. 5A below. Similarly, a network node may include any suitable combination of hardware and/or software. For example, in particular embodiments, a network node, such as network node 120, may include the components described with respect to FIG. 6A below.

Particular embodiments include a timer that restricts triggering of the same event consecutively (e.g., a prohibit timer). According to some embodiments, a counter facilitates sending a measurement report triggered by the same event every second, third, fourth, etc. triggering interval. The prohibit timer or the counter is associated with an event, such as an event corresponding with an eventId of the corresponding reportConfig within VarMeasConfig. According to some embodiments, the timer and/or counter may be defined in a UE. According to alternative embodiments, the timer and/or counter may be defined in a network node.

Particular embodiments may be described with respect to particular changes to 3GPP LTE specification TS36.331. An example is described below, with changes underlined. The underlined changes illustrate both timer and counter-based embodiments, but particular embodiments may use one or the other, or any combination thereof.

ReportConfigEUTRA information element

```
-- ASN1START
ReportConfigEUTRA ::=        SEQUENCE {
    triggerType              CHOICE {
        event                SEQUENCE {
            eventId          CHOICE {
                eventA1      SEQUENCE {
```

-continued

```
            a1-Threshold                      ThresholdEUTRA
        },
        eventA2                               SEQUENCE {
            a2-Threshold                      ThresholdEUTRA
        },
        eventA3                               SEQUENCE {
            a3-Offset                         INTEGER (-30..30),
            reportOnLeave                       BOOLEAN
        },
        eventA4                               SEQUENCE {
            a4-Threshold                      ThresholdEUTRA
        },
        eventA5                               SEQUENCE {
            a5-Threshold1                       ThresholdEUTRA,
            a5-Threshold2                       ThresholdEUTRA
        },
        ...,
        eventA6-r10                           SEQUENCE {
            a6-Offset-r10                       INTEGER (-30..30),
            a6-ReportOnLeave-r10                BOOLEAN
        },
        eventC1-r12                           SEQUENCE {
            c1-Threshold-r12                    ThresholdEUTRA-v1250,
            c1-ReportOnLeave-r12                BOOLEAN
        },
        eventC2-r12                           SEQUENCE {
            c2-RefCSI-RS-r12                    MeasCSI-RS-Id-r12,
            c2-Offset-r12                       INTEGER (-30..30),
            c2-ReportOnLeave-r12                BOOLEAN
        },
        eventV1-r14                           SEQUENCE {
            v1-Threshold-r14                    SL-CBR-r14
        },
        eventV2-r14                           SEQUENCE {
            v2-Threshold-r14                    SL-CBR-r14
        }
    },
    hysteresis                                Hysteresis,
    timeToTrigger                             TimeToTrigger
    },
    periodical                                SEQUENCE {
        purpose                               ENUMERATED {
                                                reportStrongestCells,
reportCGI}
    }
},
    triggerQuantity                           ENUMERATED {rsrp, rsrq},
    reportQuantity                            ENUMERATED {sameAsTriggerQuantity,
both},
    maxReportCells                            INTEGER (1..maxCellReport),
    reportInterval                            ReportInterval,
    reportAmount                              ENUMERATED {r1, r2, r4, r8, r16, r32, r64,
infinity},
    ...,
    [[ si-RequestForHO-r9                     ENUMERATED {setup}   OPTIONAL, --
Cond reportCGI
       ue-RxTxTimeDiffPeriodical-r9           ENUMERATED {setup}   OPTIONAL--
Need OR
    ]],
    [[ includeLocationInfo-r10                ENUMERATED {true}    OPTIONAL, -
- Need OR
       reportAddNeighMeas-r10                 ENUMERATED {setup}   OPTIONAL --
Need OR
    ]],
    [[ alternativeTimeToTrigger-r12           CHOICE {
            release                             NULL,
            setup                               TimeToTrigger
       }                                        OPTIONAL, -- Need ON
       useT312-r12                            BOOLEAN   OPTIONAL, -- Need ON
       usePSCell-r12                          BOOLEAN   OPTIONAL,  --Need
ON
       aN-Threshold1-v1250                    RSRQ-RangeConfig-r12   OPTIONAL,
-- Need ON
       a5-Threshold2-v1250                    RSRQ-RangeConfig-r12   OPTIONAL,
-- Need ON
       reportStrongestCSI-RSs-r12               BOOLEAN   OPTIONAL, -- Need
ON
       reportCRS-Meas-r12                     BOOLEAN   OPTIONAL, -- Need ON
       triggerQuantityCSI-RS-r12              BOOLEAN   OPTIONAL   -- Need
```

```
ON
    ]],
    [[ reportSSTD-Meas-r13              BOOLEAN  OPTIONAL,  -- Need
ON
       rs-sinr-Config-r13               CHOICE {
          release                           NULL,
          setup                             SEQUENCE {
             triggerQuantity-v1310            ENUMERATED {sinr}
OPTIONAL, -- Need ON
             aN-Threshold1-r13                RS-SINR-Range-r13
OPTIONAL, -- Need ON
             a5-Threshold2-r13                RS-SINR-Range-r13
OPTIONAL, -- Need ON
             reportQuantity-v1310             ENUMERATED {rsrpANDsinr,
rsrqANDsinr, all}
          }
       }                                OPTIONAL, -- Need
ON
       useWhiteCellList-r13             BOOLEAN    OPTIONAL, -
- Need ON
       measRSSI-ReportConfig-r13        MeasRSSI-ReportConfig-r13 OPTIONAL, -
- Need ON
       includeMultiBandInfo-r13         ENUMERATED {true}  OPTIONAL, -
- Cond reportCGI
       ul-DelayConfig-r13               UL-DelayConfig-r13  OPTIONAL -
- Need ON
    ]],
    [[ ue-RxTxTimeDiffPeriodicalTDD-r13  BOOLEAN    OPTIONAL
-- Need ON
    ]] ,
    [[
purpose-v14xy   ENUMERATED {reportLocation, spare3, spare2, spare1}
                                        OPTIONAL -- Need ON
    ]]
    [[ numberOfSkippedReports-r1x       ENUMERATED {n1, n2, n4, n5,
n6, n7, infinity}
                                        OPTIONAL,  -- Need ON
    ]]
    [[ reportingProhibitTimer           ENUMERATED {ms40, ms80, ms120,
       ms240, ms480, ms640, ms1024, ms2048, ms5120, ms10240, spare3,
       spare2, spare1}
                                        OPTIONAL,  -- Need On
    ]]
}
RSRQ-RangeConfig-r12 ::=                CHOICE {
    release                                NULL,
    setup                                  RSRQ-Range-v1250
}
ThresholdEUTRA ::=                      CHOICE{
    threshold-RSRP                         RSRP Range,
    threshold-RSRQ                         RSRQ Range
}
ThresholdEUTRA-v1250 ::=                CSI-RSRP-Range-r12
MeasRSSI-ReportConfig-r13 ::=           SEQUENCE {
    channelOccupancyThreshold-r13          RSSI-Range-r13   OPTIONAL
    -- Need OR
}
-- ASN1STOP
```

| ReportConfigEUTRA field descriptions |
|---|
| a3-Offset/a6-Offset/c2-Offset |
| Offset value to be used in EUTRA measurement report triggering condition for event a3/a6/c2. The actual value is field value * 0.5 dB. |
| alternativeTimeToTrigger |
| Indicates the time to trigger applicable for cells specified in altTTT-CellsToAddModList of the associated measurement object, if configured |
| aN-ThresholdM/cN-ThresholdM |
| Threshold to be used in EUTRA measurement report triggering condition for event number aN/cN. If multiple thresholds are defined for event number aN/cN, the thresholds are differentiated by M. E-UTRAN configures aN-Threshold1 only for events A1, A2, A4, A5 and a5-Threshold2 only for event A5. |
| c1-ReportOnLeave/c2-ReportOnLeave |
| Indicates whether or not the UE shall initiate the measurement reporting procedure when the leaving condition is met for a CSI-RS resource in csi-RS-TriggeredList, as specified in 5.5.4.1. |

| ReportConfigEUTRA field descriptions |
| --- |
| c2-RefCSI-RS<br>Identity of the CSI-RS resource from the measCSI-RS-ToAddModList of the associated measObject, to be used as the reference CSI-RS resource in EUTRA measurement report triggering condition for event c2.<br>channelOccupancyThreshold<br>RSSI threshold which is used for channel occupancy evaluation.<br>eventId<br>Choice of E-UTRA event triggered reporting criteria. EUTRAN may set this field to eventC1 or eventC2 only if measDS-Config is configured in the associated measObject with one or more CSI-RS resources. The eventC1 and eventC2 are not applicable for the eventId if RS-SINR is configured as triggerQuantity or reportQuantity.<br>includeMultiBandInfo<br>If this field is present, the UE shall acquire and include multi band information in the measurement report.<br>maxReportCells<br>Max number of cells, excluding the serving cell, to include in the measurement report concerning CRS, and max number of CSI-RS resources to include in the measurement report concerning CSI-RS.<br>measRSSI-ReportConfig<br>If this field is present, the UE shall perform measurement reporting for RSSI and channel occupancy and ignore the triggerQuantity, reportQuantity and maxReportCells fields. E-UTRAN only sets this field to true when setting triggerType to periodical and purpose to reportStrongestCells.<br>numberOfSkippedReports<br>Number of skipped measurement reports when the configured event is triggered for triggerType event<br>reportAmount<br>Number of measurement reports applicable for triggerType event as well as for triggerType periodical. In case purpose is set to reportCGI or reportSSTD-Meas is set to true, only value 1 applies.<br>reportCRS-Meas<br>Inidicates that UE shall include rsrp, rsrq together with csi-rsrp in the measurement report, if possible.<br>reportOnLeave/a6-ReportOnLeave<br>Indicates whether or not the UE shall initiate the measurement reporting procedure when the leaving condition is met for a cell in cellsTriggeredList, as specified in 5.5.4.1.<br>reportQuantity<br>The quantities to be included in the measurement report. The value both means that both the rsrp and rsrq quantities are to be included in the measurement report. The value rsrpANDsinr and rsrqANDsinr mean that both rsrp and rs-sinr quantities, and both rsrq and rs-sinr quantities are to be included respectively in the measurement report. The value all means that rsrp, rsrq and rs-sinr are to be included in the measurement report. In case triggerQuantityCSI-RS is included, only value sameAsTriggerQuantity applies. If reportQuantity-v1310 is configured, the UE only considers this extension (and ignores reportQuantity i.e. without suffix).<br>reportingProhibitTimer<br>Prohibits sending measurement report while reportingProhibitTimer is running for the event configured<br>reportSSTD-Meas<br>If this field is set to true, the UE shall measure SSTD between the PCell and the PSCell as specified in TS 36.214 [48] and ignore the triggerQuantity, reportQuantity and maxReportCells fields. E-UTRAN only sets this field to true when setting triggerType to periodical and purpose to reportStrongestCells.<br>reportStrongestCSI-RSs<br>Indicates that periodical CSI-RS measurement report is performed. EUTRAN configures value TRUE only if measDS-Config is configured in the associated measObject with one or more CSI-RS resources.<br>si-RequestForHO<br>The field applies to the reportCGI functionality, and when the field is included, the UE is allowed to use autonomous gaps in acquiring system information from the neighbour cell, applies a different value for T321, and includes different fields in the measurement report.<br>ThresholdEUTRA<br>For RSRP: RSRP based threshold for event evaluation. The actual value is field value - 140 dBm.<br>For RSRQ: RSRQ based threshold for event evaluation. The actual value is (field value - 40)/2 dB.<br>For RS-SINR: RS-SINR based threshold for event evaluation. The actual value is (field value -46)/2 dB.<br>For CSI-RSRP: CSI-RSRP based threshold for event evaluation. The actual value is field value - 140 dBm.<br>EUTRAN configures the same threshold quantify for all the thresholds of an event.<br>timeToTrigger<br>Time during which specific criteria for the event needs to be met in order to trigger a measurement report.<br>triggerQuantity<br>The quantity used to evaluate the triggering condition for the event concerning CRS. EUTRAN sets the value according to the quantity of the ThresholdEUTRA for this event. The values rsrp, rsrq and sinr correspond to Reference Signal Received Power (RSRP), Reference Signal Received Quality (RSRQ) and Reference Signal to Noise and Interference Ratio (RS-SINR), see TS 36.214 [48]. If triggerQuantity-v1310 is configured, the UE only considers this extension (and ignores triggerQuantity i.e. without suffix).<br>triggerQuantityCSI-RS<br>The quantity used to evaluate the triggering condition for the event concerning CSI-RS. The value TRUE corresponds to CSI Reference Signal Received Power (CSI-RSRP), see TS 36.214 [48]. E-UTRAN configures value TRUE if and only if the measurement reporting event concerns CSI-RS.<br>ue-RxTxTimeDiffPeriodical<br>If this field is present, the UE shall perform UE Rx-Tx time difference measurement reporting and ignore the fields triggerQuantity, reportQuantity and maxReportCells. If the field is present, the only applicable values for the corresponding triggerType and purpose are periodical and reportStrongestCells respectively.<br>ue-RxTxTimeDiffPeriodicalTDD<br>If this field is set to TRUE, the UE shall perform UE Rx-Tx time difference measurement reporting according to EUTRAN TDD UE Rx-Tx time difference report mapping in TS 36.133 [16]. If the field is configured, the ue-RxTxTimeDiffPeriodical shall be configured. The field is applicable for TDD only. |

| ReportConfigEUTRA field descriptions |
| --- |
| usePSCell<br>If this field is set to TRUE the UE shall use the PSCell instead of the PCell. E-UTRAN configures value TRUE only for events A3 and A5, see 5.5.4.4 and 5.5.4.6.<br>useT312<br>If value TRUE is configured, the UE shall use the timer T312 with the value t312 as specified in the corresponding measObject. If the corresponding measObject does not include the timer T312 then the timer T312 is considered as not configured. E-UTRAN configures value TRUE only if triggerType is set to event.<br>useWhiteCellList<br>Indicates whether only the cells included in the white-list of the associated measObject are applicable as specified in 5.5.4.1. E-UTRAN does not configure the field for events A1, A2, C1 and C2.<br>ul-DelayConfig<br>If the field is present, E-UTRAN configures UL PDCP Packet Delay per QCI measurement and the UE shall ignore the fields triggerQuantity and maxReportCells. The applicable values for the corresponding triggerType and reportInterval are periodical and (one of the) ms1024, ms2048, ms5120 or ms10240 respectively. The reportInterval indicates the periodicity for performing and reporting of UL PDCP Delay per QCI measurement as specified in TS 36.314 [71]. |

| Conditional presence | Explanation |
| --- | --- |
| reportCGI | The field is optional, need OR, in case purpose is included and set to reportCGI; otherwise the field is not present and the UE shall delete any existing value for this field. |

VarMeasReportList UE Variable

```
-- ASN1START
VarMeasReportList ::=        SEQUENCE (SIZE (1..maxMeasId)) OF
VarMeasReport
VarMeasReportList-r12 ::=    SEQUENCE (SIZE (1..maxMeasId-r12)) OF
VarMeasReport
VarMeasReport ::=            SEQUENCE {
    -- List of measurement that have been triggered
    measId                   MeasId,
    measId-v1250             MeasId-v1250                OPTIONAL,
    cellsTriggeredList       CellsTriggeredList          OPTIONAL,
    csi-RS-TriggeredList-r12 CSI-RS-TriggeredList-r12    OPTIONAL,
    poolsTriggeredList-r14   Tx-ResourcePoolMeasList-r14 OPTIONAL,
    numberOfReports Sent     INTEGER
    numberOfTimesEventTriggered   INTEGER
}
CellsTriggeredList ::=       SEQUENCE (SIZE (1..maxCellMeas)) OF CHOICE
{
    physCellIdEUTRA          PhysCellId,
    physCellIdUTRA           CHOICE {
        fdd                  PhysCellIdUTRA-FDD,
        tdd                  PhysCellIdUTRA-TDD
    },
    physCellIdGERAN          SEQUENCE {
        carrierFreq          CarrierFreqGERAN,
        physCellId           PhysCellIdGERAN
    },
    physCellIdCDMA2000       PhysCellIdCDMA2000,
    wlan-Identifiers-r13     WLAN-Identifiers-r12
}
CSI-RS-TriggeredList-r12 ::= SEQUENCE (SIZE (1..maxCSI-RS-Meas-r12)) OF
MeasCSI-RS-Id-r12
-- ASN1STOP
```

Section 5.5.4 of TS36.331 may be modified according to particular embodiments. For example, according to some embodiments, if the triggerType is set to event and if the entry condition applicable for the event (i.e., the event corresponding with the eventId of the corresponding reportConfig within VarMeasConfig) is fulfilled for one or more applicable cells not included in the cellsTriggeredList for all measurements after layer 3 filtering taken during timeToTrigger defined for the event within the VarMeasConfig, while the VarMeasReportList does not include a measurement reporting entry for the measId (a first cell triggers the event), then perform the following:

Include a measurement reporting entry within the VarMeasReportList for the measId. Set the numberOfReportsSent defined within the VarMeasReportList for the measId to 0. Include the concerned cell(s) in the cellsTriggeredList defined within the VarMeasReportList for the measId.

If the UE supports T312 and if useT312 is included for the event and if T310 is running, then if T312 is not running start timer T312 with the value configured in the corresponding measObject.

Initiate the measurement reporting procedure as specified in Section 5.5.5.

If the UE supports prohibit reporting timer and if the prohibit reporting timer is configured in the corresponding reportConfig for the measId and if the prohibit reporting timer is not running, then start the prohibit reporting timer with the value of reportingProhibitTimer as defined within the corresponding reportConfig for the measId.

According to some embodiments, if the triggerType is set to event and if the entry condition applicable for the event (i.e., the event corresponding with the eventId of the corresponding reportConfig within VarMeasConfig) is fulfilled for one or more applicable cells not included in the cellsTriggeredList for all measurements after layer 3 filtering taken during timeToTrigger defined for the event within the VarMeasConfig (a subsequent cell triggers the event), then perform the following.

Set the numberOfReportsSent defined within the VarMeasReportList for the measId to 0. Include the concerned cell(s) in the cellsTriggeredList defined within the VarMeasReportList for the measId;

If the UE supports T312 and if useT312 is included for the event and if T310 is running, then if T312 is not running start timer T312 with the value configured in the corresponding measObject.

Initiate the measurement reporting procedure as specified in Section 5.5.5.

Particular embodiments may include methods in a wireless device and a network node. The examples and embodiments described above may be generally represented by the flowcharts in FIGS. 3 and 4.

Figure 3:
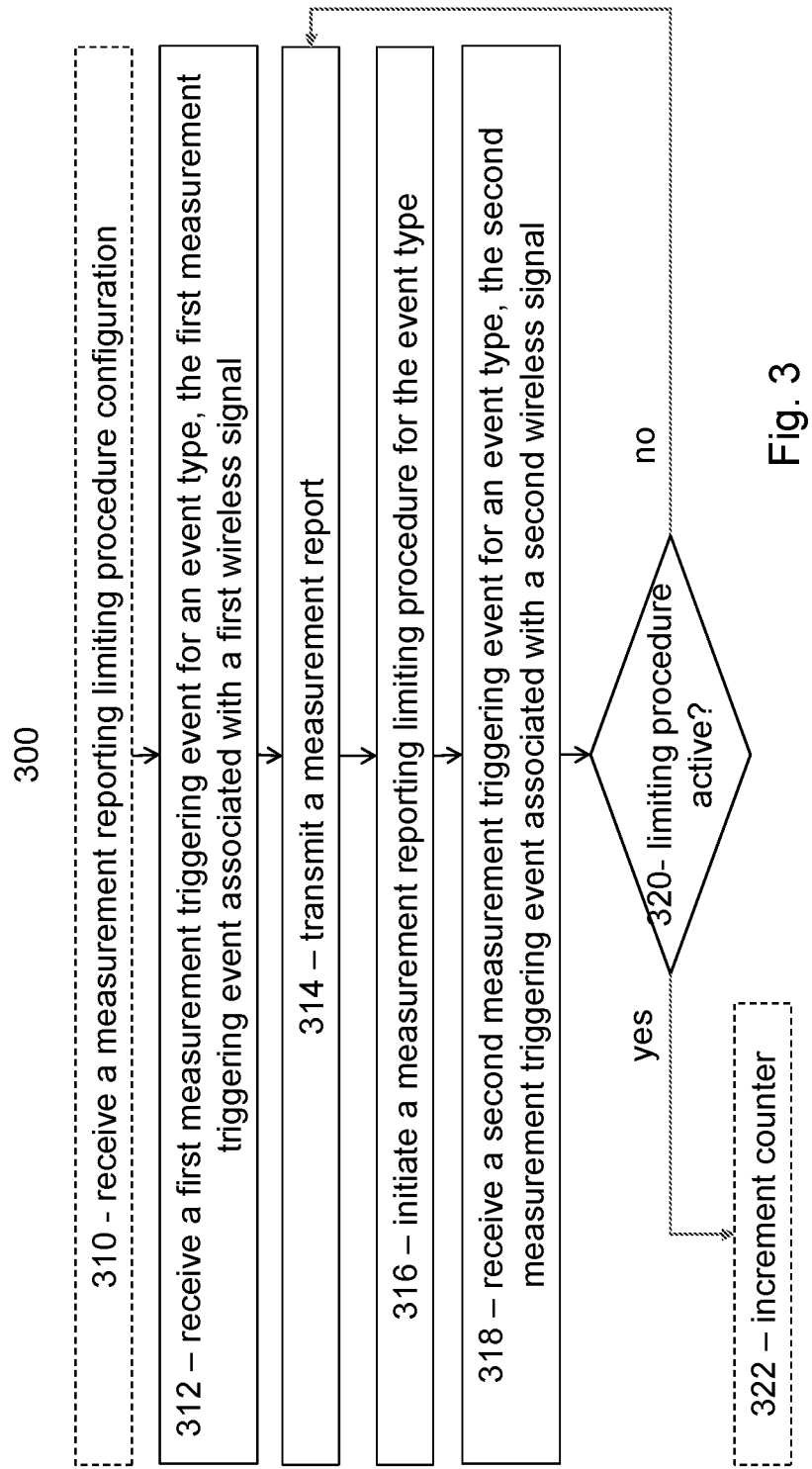
FIG. 3 is a flowchart of an example method in a wireless device, according to some embodiments.

FIG. 3 is a flow diagram illustrating an example method in a wireless device, according to some embodiments. In particular embodiments, one or more steps of FIG. 3 may be performed by wireless device 110 described with respect to FIG. 2.

The method may begin at step 310, where the wireless device receives a measurement reporting limiting procedure configuration. For example, wireless device 110 may receive a measurement limiting reporting procedure configuration from network node 120. The configuration may comprise a type of limiting procedure (e.g., timer or counter-based) and threshold values for the timers or counters. In some embodiments, the measurement limiting reporting procedure configuration is part of the measurement configuration for the wireless device.

At step 312, the wireless device receives a first measurement triggering event for an event type. The first measurement triggering event associated with a first wireless signal. For example, wireless device 110 may receive an event that a signal from a neighbor cell (e.g., 115b) has better quality than an absolute threshold. Although a particular event is described as an example, the embodiments described herein apply to any of the event types described herein.

At step 314, the wireless device transmits a measurement report. For example, wireless device 110 may send a measurement report describing the measured signal quality of the wireless signal from cell 115b to its serving network node.

At step 316, the wireless device initiates a measurement reporting limiting procedure for the event type. For example, wireless device 110 may initiate the measurement reporting limiting procedure by incrementing a counter or starting a timer.

At step 318, the wireless device receives a second measurement triggering event for the event type. The second measurement triggering event associated with a second wireless signal. For example, wireless device 110 may receive the same event type (e.g., neighbor cell has a better quality than an absolute value), but wireless device 110 may receive the triggering event from cell 115a. In other examples, the first and second signals may comprise first and second beams from the same or different cells.

At step 320, the wireless device determines whether the measurement reporting limiting procedure is active for the event type. For example, wireless device 110 may determine whether a counter associated with the event type is greater than 0 (or some other suitable value), or whether a timer associated with the event type is below a threshold timer value.

If the measurement reporting limiting procedure is active, then the wireless device continues to step 322. The wireless device does not send a measurement report. In some embodiments, the wireless device may increment counters associated with the event type (e.g., a number of skipped reports counter).

If the measurement reporting limiting procedure is not active, then the wireless device returns to step 314 where the wireless device transmits a measurement report.

Modifications, additions, or omissions may be made to method 300. Additionally, one or more steps in method 300 of FIG. 3 may be performed in parallel or in any suitable order. The steps of method 300 may be repeated over time as necessary.

Figure 4:
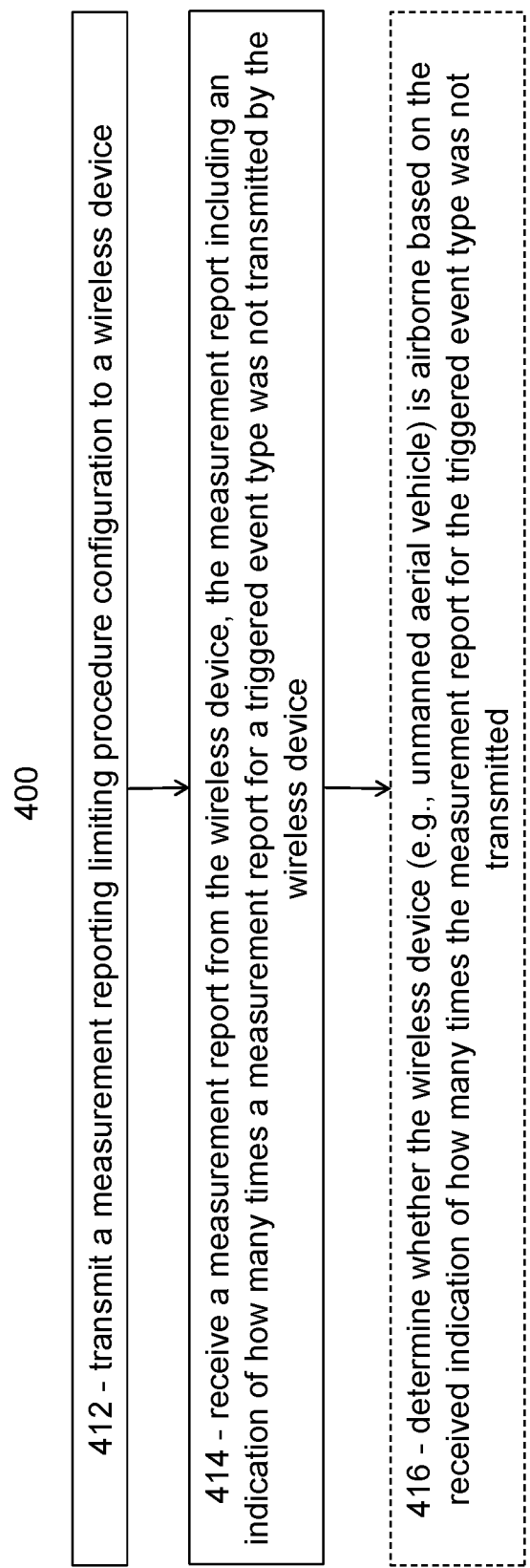
FIG. 4 is a flow diagram illustrating an example method in a network node, according to some embodiments.

FIG. 4 is a flow diagram illustrating an example method in a network node, according to some embodiments. In particular embodiments, one or more steps of FIG. 4 may be performed by network node 120 described with respect to FIG. 2.

The method begins at step 412, where a network node transmits a measurement reporting limiting procedure configuration to a wireless device. For example, network node 120 may transmit a measurement limiting reporting procedure configuration to wireless device 110. The configuration may comprise a type of limiting procedure (e.g., timer or counter-based) and threshold values for the timers or counters. In some embodiments, the measurement limiting reporting procedure configuration is part of the measurement configuration for the wireless device.

At step 414, the network node receives a measurement report from the wireless device. The measurement report includes an indication of how many times a measurement report for a triggered event type was not transmitted by the wireless device. For example, network node 120 may receive a measurement report from wireless device 110 for a particular event type. A counter in the measurement report may indicate that the previous 4 times the same event type was triggered, wireless device 110 determined not to send a measurement report.

At step 416, the network node may determine whether the wireless device is airborne based on the received indication of how many times the measurement report for the triggered event type was not transmitted. For example, wireless device 110 may comprise a UAV. If the measurement report indicates 0 reports were not transmitted, then network node 120 may determine wireless device 110 is not airborne or is flying or hovering near the ground (e.g., below the antenna height of network node 120). If the measurement report indicates that a threshold number of reports were not transmitted (e.g., 4 or more), then network node 120 may determine that wireless device 110 is flying or hovering above the antenna height of network node 120.

Modifications, additions, or omissions may be made to method 400. Additionally, one or more steps in method 400 of FIG. 4 may be performed in parallel or in any suitable order. The steps of method 400 may be repeated over time as necessary.

Figure 5B:
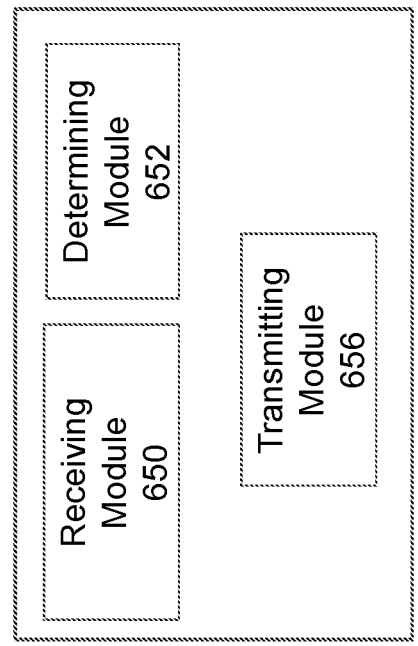
FIG. 5B is a block diagram illustrating example components of a wireless device.
Figure 5A:
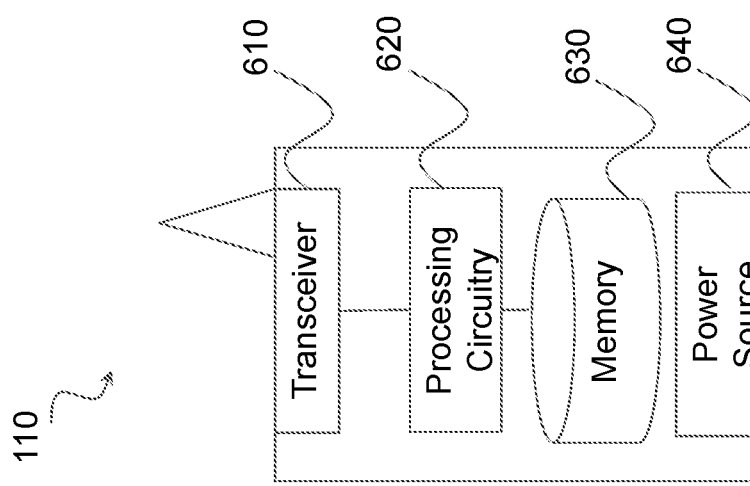
FIG. 5A is a block diagram illustrating an example embodiment of a wireless device.

FIG. 5A is a block diagram illustrating an example embodiment of a wireless device. The wireless device is an example of the wireless devices 110 illustrated in FIG. 2. In particular embodiments, the wireless device is capable of limiting transmission of measurement reports. The wireless device may receive a first measurement triggering event for an event type. The first measurement triggering event is associated with a first wireless signal. The wireless device may transmit a measurement report for the first measurement triggering event; initiate a measurement reporting limiting procedure for the event type; and receive a second measurement triggering event for the event type. The second measurement triggering event is associated with a second wireless signal different than the first wireless signal. The wireless device may determine the measurement reporting limiting procedure is active for the event type and determine not to transmit a measurement report for the second measurement triggering event. The wireless device may comprise an unmanned aerial vehicle (AEV).

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 610, processing circuitry 620, memory 630, and power source 640. In some embodiments, transceiver 610 facilitates transmitting wireless signals to and receiving wireless signals from wireless network node 120 (e.g., via an antenna), processing circuitry 620 executes instructions to provide some or all of the functionality described herein as provided by the wireless device, and memory 630 stores the instructions executed by processing circuitry 620. Power source 640 supplies electrical power to one or more of the components of wireless device 110, such as transceiver 610, processing circuitry 620, and/or memory 630.

Processing circuitry 620 includes any suitable combination of hardware and software implemented in one or more integrated circuits or modules to execute instructions and manipulate data to perform some or all of the described functions of the wireless device. In some embodiments, processing circuitry 620 may include, for example, one or more computers, one more programmable logic devices, one or more central processing units (CPUs), one or more microprocessors, one or more applications, and/or other logic, and/or any suitable combination of the preceding. Processing circuitry 620 may include analog and/or digital circuitry configured to perform some or all of the described functions of wireless device 110. For example, processing circuitry 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 640 is generally operable to supply electrical power to the components of wireless device 110. Power source 640 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 5A) responsible for providing certain aspects of the wireless device's functionality, including any of the functionality described above and/or any additional functionality (including any functionality necessary to support the solution described above).

FIG. 5B is a block diagram illustrating example components of a wireless device 110. The components may include receiving module 650, determining module 652, and transmitting module 656.

Receiving module 650 may perform the receiving functions of wireless device 110. For example, receiving module 650 may receive measurement triggering events according to any of the examples or embodiments described above (e.g., step 310 of FIG. 3). In certain embodiments, receiving module 650 may include or be included in processing circuitry 620. In particular embodiments, receiving module 650 may communicate with determining module 652 and transmitting module 656.

Determining module 652 may perform the determining functions of wireless device 110. For example, determining module 652 may determine a measurement reporting limiting procedure is active for an event type and determine not to transmit a measurement report for the event type based on any of the embodiments or examples described above (e.g., step 320 of FIG. 3). In certain embodiments, determining module 652 may include or be included in processing circuitry 620. In particular embodiments, determining module 652 may communicate with receiving module 650 and transmitting module 656.

Transmitting module 656 may perform the transmitting functions of wireless device 110. For example, transmitting module 656 may transmit measurement reports according to any of the examples or embodiments described above (e.g., step 314 of FIG. 3). In certain embodiments, transmitting module 656 may include or be included in processing circuitry 620. In particular embodiments, transmitting module 656 may communicate with receiving module 650 and determining module 652.

Figure 6B:
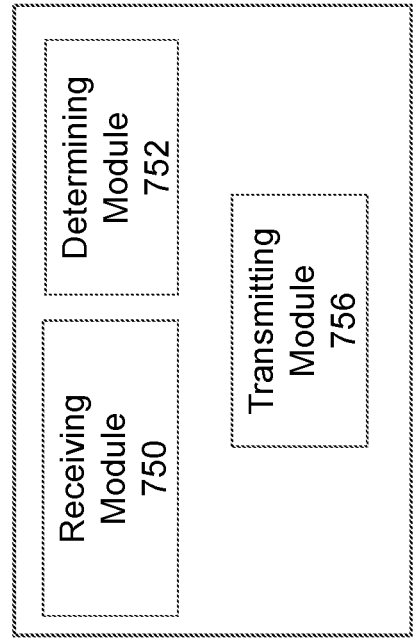
FIG. 6B is a block diagram illustrating example components of a network node.
Figure 6A:
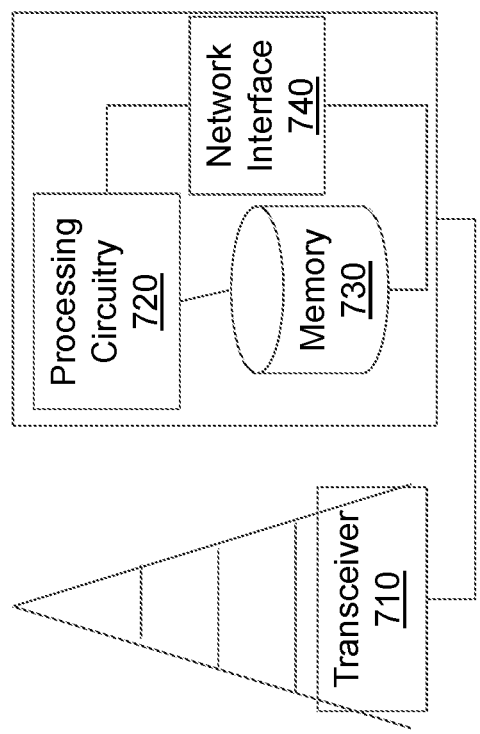
FIG. 6A is a block diagram illustrating an example embodiment of a network node.

FIG. 6A is a block diagram illustrating an example embodiment of a network node. The network node is an example of the network node 120 illustrated in FIG. 2. In particular embodiments, the network node is capable of limiting transmission of measurement reports. The network node may transmit a measurement reporting limiting procedure configuration to a wireless device and receive a measurement report from the wireless device. The measurement report includes an indication of how many times a measurement report for a triggered event type was not transmitted by the wireless device.

Network node 120 can be an eNodeB, a nodeB, gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 710, processing circuitry 720, at least one memory 730, and at least one network interface 740. Transceiver 710 facilitates transmitting wireless signals to and receiving wireless signals from a wireless device, such as wireless devices 110 (e.g., via an antenna); processing circuitry 720 executes instructions to provide some or all of the functionality described above as being provided by a network node 120; memory 730 stores the instructions executed by processing circuitry 720; and network interface 740 communicates signals to backend network components, such as a gateway, switch, router, Internet, Public Switched Telephone Network (PSTN), controller, and/or other network nodes 120. Processing circuitry 720 and memory 730 can be of the same types as described with respect to processing circuitry 620 and memory 630 of FIG. 5A above.

In some embodiments, network interface 740 is communicatively coupled to processing circuitry 720 and refers to any suitable device operable to receive input for network node 120, send output from network node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

Other embodiments of network node 120 include additional components (beyond those shown in FIG. 6A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 6B is a block diagram illustrating example components of a network node 120. The components may include receiving module 750, determining module 752, and transmitting module 756.

Receiving module 750 may perform the receiving functions of network node 120. For example, receiving module 750 may receive a measurement report according to any of the examples or embodiments described above (e.g., step 414 of FIG. 4). In certain embodiments, receiving module 750 may include or be included in processing circuitry 720. In particular embodiments, receiving module 750 may communicate with determining module 752 and transmitting module 756.

Determining module 752 may perform the determining functions of network node 120. For example, determining module 752 may determine whether a wireless device is airborne based on the received indication of how many times the measurement report for the triggered event type was not transmitted, according to any of the embodiments or examples described above (e.g., step 416 of FIG. 4). In certain embodiments, determining module 752 may include or be included in processing circuitry 720. In particular embodiments, determining module 752 may communicate with receiving module 750 and transmitting module 756.

Transmitting module 756 may perform the transmitting functions of network node 120. For example, transmitting module 756 may transmit a measurement reporting limiting procedure configuration to a wireless device according to any of the examples or embodiments described above (e.g., step 412 of FIG. 4). In certain embodiments, transmitting module 756 may include or be included in processing circuitry 720. In particular embodiments, transmitting module 756 may communicate with receiving module 750 and determining module 752.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CSI-RS Channel State Information Reference Signal
D2D Device to Device
DL Downlink
eNB eNodeB
FDD Frequency Division Duplex
IoT Internet-of-Things
LTE Long Term Evolution
M2M Machine to Machine
MCS Modulation and Coding Scheme
MIMO Multi-Input Multi-Output
MTC Machine Type Communication
NR New Radio
OFDM Orthogonal Frequency Division Multiplex
RAN Radio Access Network
RAT Radio Access Technology
RB Resource Block
RBS Radio Base Station
RE Resource Element
RNC Radio Network Controller
RRC Radio Resource Control
RRH Remote Radio Head
RRU Remote Radio Unit
RSRP Reference Signal Received Power
RSRQ Reference Signal Received Quality
RS-SINR Reference Signal Signal-to-Interference-plus-Noise Ratio
SC-FDMA Single Carrier-Frequency Division Multiple Access
SS System Synchronization
TDD Time Division Duplex
UAV Unmanned Aerial Vehicle
UE User Equipment
UL Uplink
URLLC Ultra-Reliable Low Latency Communication
UTRAN Universal Terrestrial Radio Access Network
WAN Wireless Access Network

The invention claimed is:

1. A method in a wireless device of limiting transmission of measurement reports, the method comprising:
receiving a first measurement triggering event for an event type, the first measurement triggering event associated with a first wireless signal;
transmitting a measurement report for the first measurement triggering event;
initiating a measurement reporting limiting procedure for the event type;
while the measurement reporting limiting procedure is active, receiving a second measurement triggering event for the event type, the second measurement triggering event associated with a second wireless signal different than the first wireless signal;
determining whether the measurement reporting limiting procedure is active for the event type; and
upon determining the measurement reporting limiting procedure is active for the event type, determining not to transmit a measurement report for the second measurement triggering event.

2. The method of claim 1, wherein initiating the measurement reporting limiting procedure for the event type comprises starting a timer.

3. The method of claim 2, wherein determining whether the measurement reporting limiting procedure is active for the event type comprises determining whether the timer has expired.

4. The method of claim 1, wherein initiating the measurement reporting limiting procedure for the event type comprises resetting a counter.

5. The method of claim 4, wherein:
determining whether the measurement reporting limiting procedure is active for the event type comprises determining whether the counter is below a threshold value; and
upon determining the measurement reporting limiting procedure is active for the event type, the method further comprises incrementing the counter.

6. The method of claim 1, further comprising:
upon determining the measurement reporting limiting procedure is not active for the event type, transmitting a measurement report for the second measurement triggering event.

7. The method of claim 1, further comprising receiving a measurement reporting limiting procedure configuration.

8. The method of claim 7, wherein the measurement reporting limiting procedure configuration comprises at least one of a timer value or a counter threshold value.

9. The method of claim 1, wherein the first wireless signal originates from a first cell and the second wireless signal originates from a second cell different than the first cell.

10. The method of claim 1, wherein the first wireless signal comprises a first beamformed wireless signal and the second wireless signal comprises a second beamformed wireless signal.

11. A wireless device comprising processing circuitry, the processing circuitry operable to:
receive a first measurement triggering event for an event type, the first measurement triggering event associated with a first wireless signal;
transmit a measurement report for the first measurement triggering event;
initiate a measurement reporting limiting procedure for the event type;
while the measurement reporting limiting procedure is active, receive a second measurement triggering event for the event type, the second measurement triggering event associated with a second wireless signal different than the first wireless signal;
determine whether the measurement reporting limiting procedure is active for the event type; and
upon determining the measurement reporting limiting procedure is active for the event type, determine not to transmit a measurement report for the second measurement triggering event.

12. The wireless device of claim 11, wherein the processing circuitry is operable to initiate the measurement reporting limiting procedure for the event type by starting a timer.

13. The wireless device of claim 1, wherein the processing circuitry is operable to determine whether the measurement reporting limiting procedure is active for the event type by determining whether the timer has expired.

14. The wireless device of claim 11, wherein the processing circuitry is operable to initiate the measurement reporting limiting procedure for the event type by resetting a counter.

15. The wireless device of claim 14, wherein the processing circuitry is operable to:
determine whether the measurement reporting limiting procedure is active for the event type by determining whether the counter is below a threshold value; and
upon determining the measurement reporting limiting procedure is active for the event type, increment the counter.

16. The wireless device of claim 11, the processing circuitry further operable to:
upon determining the measurement reporting limiting procedure is not active for the event type, transmit a measurement report for the second measurement triggering event.

17. The wireless device of claim 11, the processing circuitry further operable to receive a measurement reporting limiting procedure configuration.

18. The wireless device of claim 17, wherein the measurement reporting limiting procedure configuration comprises at least one of a timer value or a counter threshold value.

19. The wireless device of claim 11, wherein the first wireless signal originates from a first cell and the second wireless signal originates from a second cell different than the first cell.

20. The wireless device of claim 11, wherein the first wireless signal comprises a first beamformed wireless signal and the second wireless signal comprises a second beamformed wireless signal.

21. The wireless device of claim 11, wherein the wireless device comprises an unmanned aerial vehicle.

22. A method in a network node of limiting transmission of measurement reports, the method comprising:
transmitting a first measurement triggering event for an event type to the wireless device, the first measurement triggering event associated with a first wireless signal;
transmitting a measurement reporting limiting procedure configuration to a wireless device;
transmitting a second measurement triggering event for the event type to the wireless device, the second measurement triggering event associated with a second wireless signal different than the first wireless signal; and
receiving a measurement report from the wireless device, the measurement report including an indication of how many times a measurement report for a triggered event type was not transmitted by the wireless device, wherein receiving the measurement report from the wireless device is in response to the wireless device receiving the second measurement triggering event for the event type of the wireless device while the measurement reporting limiting procedure is active.

23. A network node comprising processing circuitry, the processing circuitry operable to:
transmit a first measurement triggering event for an event type to the wireless device, the first measurement triggering event associated with a first wireless signal;
transmit a measurement reporting limiting procedure configuration to a wireless device;

transmit a second measurement triggering event for the event type to the wireless device, the second measurement triggering event associated with a second wireless signal different than the first wireless signal; and receive a measurement report from the wireless device, the measurement report including an indication of how many times a measurement report for a triggered event type was not transmitted by the wireless device, wherein reception of the measurement report from the wireless device is in response to the wireless device receiving the second measurement triggering event for the event type of the wireless device while the measurement reporting limiting procedure is active.

24. The network node of claim 23, wherein the measurement reporting limiting procedure configuration comprises at least one of a timer value or a counter threshold value.

25. The network node of claim 23, wherein the wireless device comprises an unmanned aerial vehicle.

26. The network node of claim 25, the processing circuitry further operable to determine whether the unmanned aerial vehicle is airborne based on the received indication of how many times the measurement report for the triggered event type was not transmitted.

* * * * *